United States Patent [19]

Caldwell

[11] Patent Number: 4,467,428
[45] Date of Patent: Aug. 21, 1984

[54] AUTOMATIC SPEED CONTROL SYSTEMS

[75] Inventor: Kenneth B. Caldwell, Rugby, England

[73] Assignee: Associated Engineering Limited, Rugby, England

[21] Appl. No.: 285,533

[22] Filed: Jul. 21, 1981

[30] Foreign Application Priority Data

Aug. 8, 1980 [GB] United Kingdom ............... 8025882

[51] Int. Cl.³ ............................................. G05D 13/00
[52] U.S. Cl. .............................. 364/426; 364/431.07; 180/179; 180/170
[58] Field of Search ......................... 364/426, 431.07; 180/170, 176, 178, 179

[56] References Cited

U.S. PATENT DOCUMENTS

| 3,575,256 | 2/1969 | Jania et al. | 180/176 |
| 3,648,798 | 3/1972 | Jania | 180/176 |
| 3,820,624 | 6/1974 | Sakakibara | 180/176 |
| 3,878,915 | 4/1975 | Purland et al. | 180/170 |
| 4,140,202 | 2/1979 | Noddings et al. | 364/426 X |
| 4,171,030 | 10/1979 | Ruhl | 180/179 |
| 4,215,760 | 8/1980 | Sakakibara et al. | 180/176 |
| 4,325,336 | 4/1982 | Kuno et al. | 180/179 X |
| 4,336,566 | 6/1982 | Noddings et al. | 180/178 X |

FOREIGN PATENT DOCUMENTS

| 2380586 | 9/1978 | France . | |
| 1386961 | 2/1971 | United Kingdom . | |
| 2051419 | 1/1981 | United Kingdom | 180/170 |

Primary Examiner—Felix D. Gruber
Assistant Examiner—Ronni S. Malamud
Attorney, Agent, or Firm—Leydig, Voit, Osann, Mayer & Holt, Ltd.

[57] ABSTRACT

A vehicle speed control system is disclosed which is primarily intended for heavy vehicles and which is arranged to 'anticipate' an uphill section of road immediately following a downhill section, so as to prevent loss of momentum gained on the downhill section. A comparator compares an actual speed signal Vs with a driver-settable desired speed signal Vr and produces an error signal. A level changing circuit produces an output equal to Vr in normal circumstances, but which follows Vs when the vehicle accelerates downhill. This output is fed through a memory via a switch which is open when an acceleration-deceleration unit detects that the vehicle has reached the foot of the hill. This memory therefore stores a signal Vr' representing the speed at that time, and the comparator therefore increases the engine power when the vehicle speed has fallen below this augmented reference speed, instead of waiting for the speed to fall to the original reference. Another comparator detects when the vehicle speed on the uphill section has fallen to the original desired speed and closes the memory switch so that the reference reverts to Vr. Another unit closes the memory switch to ensure that the reference is brought back from Vr' to Vr if the vehicle speed increases (such as if the downhill section is followed by a level section of an uphill section).

4 Claims, 3 Drawing Figures

FIG. I.

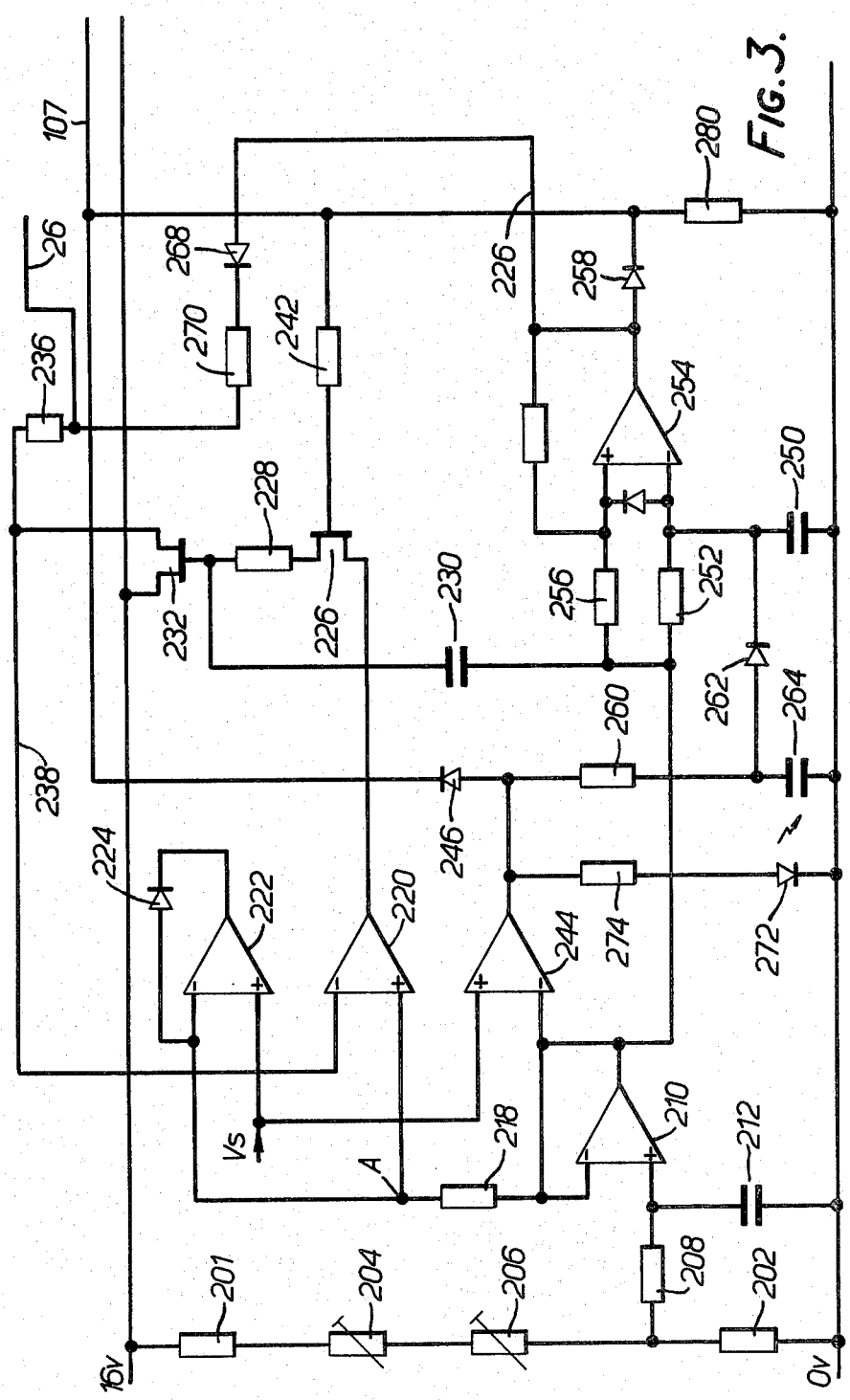

AUTOMATIC SPEED CONTROL SYSTEMS

BACKGROUND OF THE INVENTION

The invention relates to speed-responsive electrical systems and circuit arrangements and more specifically to such systems and circuit arrangements responsive to the speed of a vehicle, such as a road vehicle, and, for example, for automatically controlling the speed of the vehicle.

Automatic speed control systems are known by which the driver may select a desired speed for the vehicle and the system thereafter automatically adjusts the engine power so as to tend to keep the vehicle speed at the desired value.

However, known systems have a disadvantageous effect when a vehicle descends a slope particularly if the downhill slope is followed by an uphill section. When a vehicle under control of such a system descends a hill, the vehicle will accelerate and its speed will become well in excess of the desired speed value. During this process, therefore, the system will reduce the engine power to a minimum. If the downhill stretch of road is followed by an uphill section, then the vehicle speed will fall as the vehicle begins to run uphill, but the system will not begin to increase the engine power from its minimum setting until the actual speed has fallen to the value represented by the desired speed value. Therefore, a large amount of the momentum gained by the vehicle in running downhill will be lost. This is particularly disadvantageous when the vehicle is a heavy vehicle, a truck for example.

An object of the invention is to provide an improved automatic vehicle speed control system.

A more specific object of the invention is to provide an automatic vehicle speed control system which helps to avoid loss of the kinetic energy gained when the vehicle runs downhill.

BRIEF SUMMARY OF THE INVENTION

According to the invention, there is provided a vehicle speed control system, comprising means for setting the value of a desired speed signal representing the desired speed of the vehicle, means for producing an actual speed signal representing the actual speed of the vehicle, comparing means for comparing the desired speed signal with the actual speed signal to produce a speed error signal, output means responsive to the error signal for automtically adjusting the power of the engine of the vehicle in a direction and by an amount tending to reduce the error signal to zero, and modifying means operative when the actual vehicle speed rises above the desired speed by more than a predetermined amount to temporarily modify the desired speed signal so that the speed which it represents is augmented by an amount dependent on the maximum amount by which the actual vehicle speed has risen above the desired speed, whereby when the actual vehicle speed falls below the speed represented by the modified desired speed signal the output means increases the engine power unless prevented by an acceleration signal, and acceleration detecting means for producing a said acceleration signal if the vehicle starts to accelerate significantly.

DESCRIPTION OF THE DRAWINGS

Electrical systems for automatically controlling a road vehicle to run at a set speed which may be selected by the driver, and embodying the invention, will now be described, by way of example only, with reference to the accompanying diagrammatic drawings in which:

FIG. 3 is a separate circuit diagram of one of the systems.

DESCRIPTION OF PREFERRED EMBODIMENTS

Figure 1:
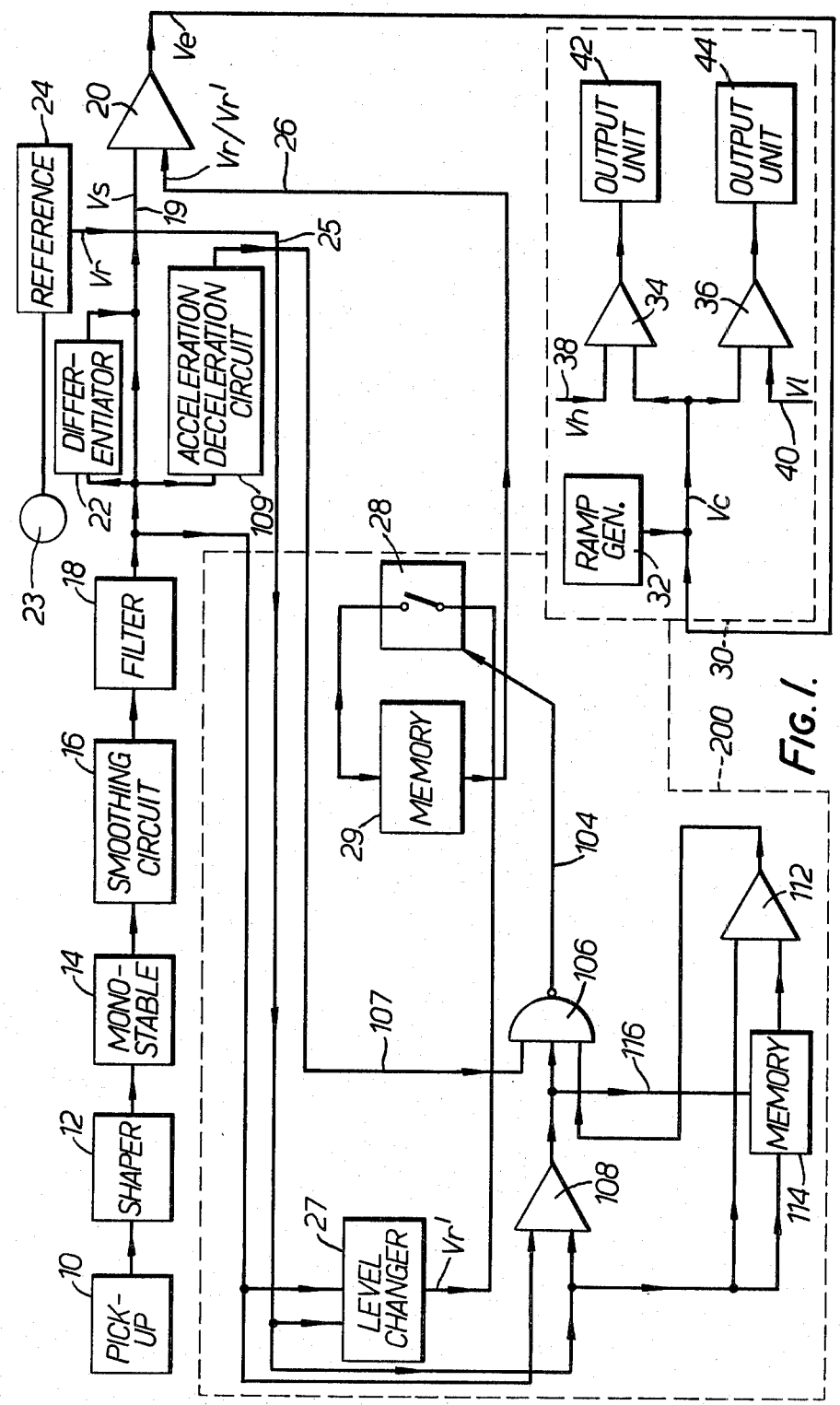
FIG. 1 is a block circuit diagram of one of the systems.

As shown in FIG. 1, a signal representing the speed of the vehicle is derived by means of a pick-up 10 which may be in the form of a transducer, such as a magnetic transducer, sensing rotation of the propeller shaft of the vehicle. The pick-up 10 produces pulses at a frequency dependent on the road speed of the vehicle and these are shaped into a square wave in a shaper 12 and used to control a monostable 14 which therefore produces constant width pulses at a frequency dependent on the road speed. A smoothing circuit 16 smoothes the pulses into a unidirectional voltage having a value which is dependent on road speed (in this example it is arranged to be inversely dependent on road speed). A filter 18 removes most of the ripple on this voltage to produce an output signal which is fed to the first input 19 of a comparator 20 and also to a differentiator 22 which feeds the same input of the comparator. The effect of the differentiation 22 is to augment the signal applied to the comparator 20 from the filter 18 when a sudden change occurs in the filter output. The purpose of this is to tend to stabilise the control system.

The signal applied to the first input of the comparator 20 is referred to below as Vs and is inversely dependent on the road speed of the vehicle.

In order to be able to select the desired road speed for the vehicle, the driver has a control 23 by means of which he can adjust a reference 24 (a potential divider network, for example) to produce a desired speed signal Vr on a line 25. Signal Vr is fed to the second input 26 of the comparator 20 through a level changer 27, a switch 28 and a memory 29. The operation of the memory 29 is explained in further detail below. Briefly, however, it enables the value of the signal Vr to be augmented under certain circumstances.

Assuming initially that the level changer 27 is simply passing the signal Vr, unchanged, to the memory 29 through the closed switch 28, the output of memory 29 will be Vr and it will be apparent that the output of the comparator 20 is an error signal, Ve, whose sign and magnitude are dependent on the sign and magnitude of the difference between the desired speed Vr and the actual speed Vs. The signal Ve is fed to an output control unit 30 to adjust the power output of the vehicle's engine in a direction and by an amount so as to bring the vehicle speed to the desired value Vr, at which the value of the error to zero.

The output control circuit 30 may take any convenient form. In the example being considered, it comprises a ramp generator 32 which generates an electrical waveform of triangular shape which ramps between fixed limits and which is added to the error signal Ve. The resultant signal Vc is fed into two comparators 34 and 36 whose second inputs receive respective fixed reference levels. The second input of the comparator 34 receives a relatively high fixed reference level Vh on a line 38 and the second input of comparator 36 receives a relatively low reference signal Vl on a line 40.

Figure 2:
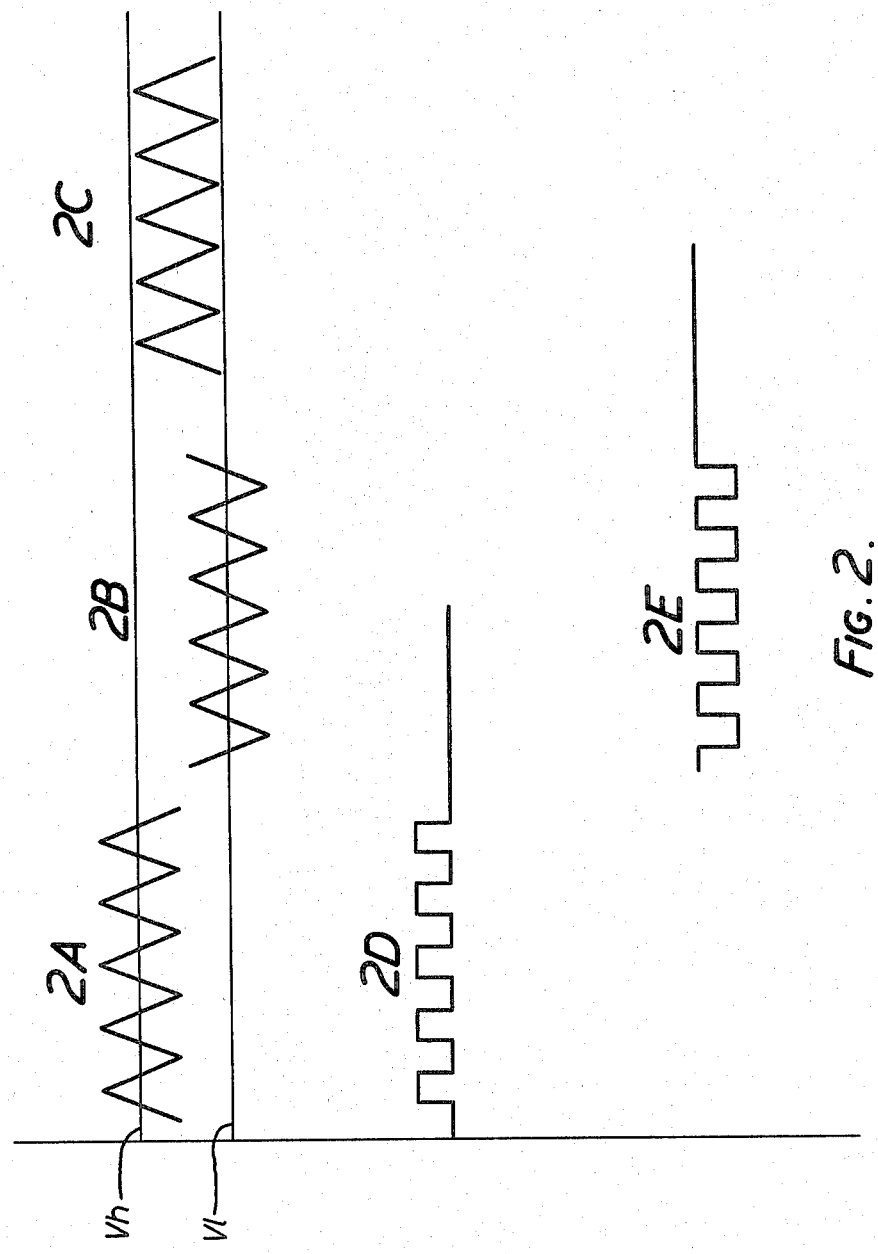
FIG. 2 shows waveforms occurring in the systems of FIG. 1.

FIG. 2 explains the operation of the comparators 34 and 36 and shows the upper and lower fixed references Vh and Vl. At FIG. 2A is shown the signal Vc in circumstances in which the vehicle speed is above the desired value, this therefore being a situation in which Ve is significantly above its datum value. The effect of this is that the peaks of Vc rise above Vh causing the comparator 34 to produce a succession of output pulses, FIG. 2D, at the ramp frequency, and these pulses drive an output unit 42 whose operation tends to decrease the output power of the vehicle engine. During this time comparator 36 produces a continuous output which holds an output unit 44 in a setting in which it does not tend to increase the engine power.

At FIG. 2B, the signal Vc is shown when the vehicle speed is below the desired value, this being a situation in which Ve is significantly below the datum value. Therefore, the troughs of Vc fall below the reference Vl and comparator 36 produces output pulses (FIG. 2E) which drive the output unit 44 and cause it to increase the power of the engine. Comparator 34 produces no output and output unit 42 is therefore held in a setting in which it does not tend to decrease the engine power.

At FIG. 2C, the vehicle speed is assumed to be at the correct value and the signal Vc lies wholly between the upper and lower references Vh and Vl. Therefore, comparator 34 produces no output and comparator 36 produces the continuous output mentioned above, and the engine power is maintained constant.

When there is a speed error, the mark-space ratio at which the appropriate output unit 42 or 44 (depending on whether the vehicle speed is above or below the desired speed) is operated will depend on the magnitude of the speed error.

The output units 42 and 44 can control the engine power in any suitable way such as by controlling the engine throttle, or the injection pump rack in the case of a diesel engine, by a suitable electrical, mechanical or pneumatic or other linkage. Purely by way of example, reference is made to our United Kingdom Pat. No. 1386961 for a disclosure of some possible ways of controlling engine power.

The purpose of the memory 29 (FIG. 1), and its associated components, which will now be described, is to enable the automatic speed control system to make best use of the momentum which the vehicle may gain in accelerating under the influence of gravity down a hill.

Without the addition of the memory 29, the reference signal applied to the comparator 20 will be constant (and equal to Vr). If the vehicle now descends a hill, the vehicle will accelerate and its speed will become well in excess of the speed represented by Vr. During this process, the signal Ve from the comparator 20 will reduce the engine power to a minimum. If the downhill stretch of road is followed by an uphill section, then the vehicle speed will fall as the vehicle begins to run uphill, and the comparator output will not begin to increase the engine power from its minimum setting until the actual speed has fallen to the value represented by Vr. Therefore, a large amount of the momentum gained by the vehicle in running downhill will be lost. This is particularly disadvantageous when the vehicle is a heavy vehicle, a truck for example. In a manner to be described, the memory 29 and its associated components mitigate this problem.

The memory 29 receives its input via the level changing unit 27 which is fed with Vr and with Vs. When Vs is greater than Vr (that is, the actual speed is less than the desired speed), the output of unit 27 is Vr. However, when Vs becomes less than Vr (that is, the vehicle speed becomes greater than the desired speed), the unit 27 produces a modified output Vr' which follows Vs (through maintained slightly more than Vs).

The switch 28 is controlled by a line 104 fed from the output of a NAND gate 106 and is opened when the gate output switches to "1". One input of gate 106 is received from a comparator 108 which compares Vr with Vs and produces a "0" output when Vr is greater than Vs and a "1" output in the reverse circumstances. The second input of gate 106 is received on a line 107 from an acceleration/deceleration detecting unit 109 (responsive to Vs) and carries a "1" output when the vehicle is accelerating and a "0" output when the vehicle is decelerating. The third input to gate 106 is from a comparator 112. The latter compares the actual value of Vr with a version of Vr stored in an auxiliary memory 114 and produces a "0" output when the actual value of Vr is less than the stored value but otherwise produces a "1" output. Memory 114 is cancelled by a "1" output on line 116 from comparator 108.

Memory 29 may for example be in the form of a capacitor. While switch 28 is closed, the memory output follows the memory input. When switch 28 is opened, however, memory 29 stores the value of the last-received input and feeds it to the second input of comparator 20.

As the vehicle commences to run downhill, the signal Vs will become less than Vr. The level changing unit 27 therefore produces an output Vr' slightly greater than, but following, Vs. Therefore, comparator 108 produces a "0" output. However, as the vehicle is accelerating line 107 carries a "1" output. Switch 28 is therefore held closed and the signal Vr' is fed through the memory 29 to the comparator 20. Comparator 20 senses that Vr' is slightly greater than Vs and will therefore hold the engine power at a reduced level.

During this time, comparator 112 will produce a "0" output because its two inputs will be the same.

Assuming that the downhill stretch of road is followed by an uphill stretch, the vehicle will decelerate as it begins to climb the uphill slope. Therefore, line 107 will switch to "0". Gate 106 now produces a "1" output which opens switch 28. Memory 29 therefore stores the value of Vr' at that time which represents a speed just below the maximum speed reached by the vehicle at the bottom of the slope. Therefore, the sign of the error signal Ve from the comparator 20 will change when the actual speed of the vehicle has fallen below the speed represented by Vr'. In response to this change of sign, the output unit 30 begins to increase the engine power. Because Vr' is less than Vr, the output unit 30 begins to increase the engine power well before the vehicle speed has dropped to the level represented by Vr. In this way, the engine power comes on in anticipation of the hill that the vehicle is about to climb.

For example, the driver may have set the signal Vr to represent a speed of, say, 65 kilometers per hour. While running down the downhill slope, the vehicle may accelerate to, say, 90 kilometers per hour. This means, therefore, that the signal Vr' applied to the input 26 of the comparator 20 at the end of the downhill slope will represent, say, 87 kilometers per hour, and therefore the output unit 30 will begin to increase the engine power when the vehicle speed has dropped below 87 kilometers per hour.

Assuming that the uphill slope is comparatively steep, the vehicle's speed will continue to decelerate even though the output unit 30 is increasing the engine power. When the actual vehicle speed has in fact fallen to the level represented by the signal Vr, the output of the level changing unit 27 is held at Vr and comparator 108 detects that Vs had become equal to Vr and switches to a "1" output which closes switch 28. This action cancels the signal Vr' stored in the memory 29 and the signal on the second input of the comparator 20 now changes from Vr' to Vr, and this prevents the vehicle from overspeeding when it reaches the top of the uphill slope.

In the situation considered above, it was assumed that the vehicle speed would continue to decelerate even though the comparator 20 increases the engine power as a result of detecting that Vs represents a speed less than Vr'. However, the road conditions may be such that the vehicle does not continue to decelerate, or does not decelerate at all but accelerates as the power comes on. For example, the downhill section of road might be followed not by an uphill section but by a level section. Therefore, the vehicle begins to accelerate when the comparator 20 starts to increase the engine power. As the vehicle begins to accelerate under the circumstances, the line 107 will switch to "1" and will therefore close switch 28 and will change the output of the memory to the value of the output of the level changing unit 27. Because the vehicle has accelerated, the output of unit 27 will be slightly less than the signal stored in the memory immediately before switch 28 closes, that is, closer to Vs. Therefore, comparator 20 will reduce the engine power and the vehicle will start to slow down. Therefore, when switch 28 is opened again (by line 107), the new signal stored in the memory 29 will represent a lower speed. The vehicle may then tend to accelerate again when its speed has fallen to this lower level but once again line 107 opens switch 28 and will alter the value of Vr' fed to comparator 20 so as to be closer to Vs. This causes a further reduction in power and a further reduction in vehicle speed. In this way, the vehicle is gradually slowed down until it reaches the speed represented by Vr.

The purpose of the memory 114 is to prevent the system misinterpreting the driver's reduction of desired speed as a hill. If the driver alters Vr because he requires the vehicle to travel at a lower speed, the two inputs to comparator 112 will become different and the comparator will produce a "1" output. This will prevent switch 28 from being opened even though comparator 108 will now be producing a "0" output. Therefore, the two inputs to the comparator 20 will continue to be Vs and Vr and this comparator will therefore hold the engine power at a minimum until the vehicle speed has dropped to the new, lower, required value. When this occurs, the output of comparator 108 will switch to "1". By means of line 116 this cancels the original value of Vr stored in memory 114 and therefore the output of comparator 112 switches to "0", enabling the system to operate normally in the event of a hill.

FIG. 3 is a schematic circuit diagram showing one form which the items within the block 200 of FIG. 1 can take.

As shown in FIG. 3, the circuit 24 for setting the signal Vr comprises a potential divider network made up of fixed resistors 201 and 202 and variable resistors 204 and 206, with the signal Vr being developed across resistor 202 in dependence on the settings of the variable resistors 204 and 206. The signal Vr is fed through a resistor 208 to one input of an operational amplifier 210 having a smoothing capacitor 212 connected to it. The output of the amplifier 210 is connected to the other input via a feedback loop 214 so as to produce the signal Vr on a line 216. Line 216 is connected through a resistor 218 to the positive input of an operational amplifier 220 and the negative input of an operational amplifier 222. The positive input of operational amplifier 222 receives the signal Vs from the output of the filter 18. Amplifier 222 constitutes the level changing unit 27 of FIG. 1 and has its output connected to its negative input through a diode 224. In a manner to be explained, the output of the level changing unit is developed at point A, and amplifier 220 controls the feeding of this signal to a field effect transistor 226 constituting the switch 28 of FIG. 1. The source-drain circuit of the FET 226 feeds the memory input signal through a resistor 228 to a capacitor 230, constituting the memory 29 (FIG. 1) and to the gate of a second field effect transistor 232. The output of the memory is produced on the line 238 and fed to comparator 20 by means of a resistor 236 and the line 26 (see FIG. 1) and also back to the negative input of amplifier 220 by means of a feedback loop 238.

For controlling FET 226, a signal is fed to its gate from the acceleration/deceleration unit 109 (see FIG. 1) on line 107 and via a resistor 242. In addition, the FET is controlled by an operational amplifier 244 which constitutes the comparator 108 of FIG. 1. On its negative input, it receives the signal Vr from amplifier 210, and its positive input it receives the signal Vs. Its output is fed to the gate of the FET 226 through a diode 246.

Memory 114 (FIG. 1) is constituted by a capacitor 250 which is supplied with the signal Vr from the output of amplifier 210 through a resistor 252. The signal stored on capacitor 250 is fed to one input of an operational amplifier 254 constituting the comparator 112 of FIG. 1, whose second input is fed directly with the signal Vr through a resistor 256. The output of amplifier 254 is fed to the gate of FET 226 through a diode 258.

Therefore, resistors 242 and 280 and diodes 246 and 258 constitute the NAND gate 106 of FIG. 1.

The operation of the circuit of FIG. 3 will now be described.

When Vs is greater than Vr, diode 224 is biased non-conductive and therefore the signal at point A will be held at the value of Vr. However, when Vs becomes less than Vr, diode 224 becomes conductive, and point A now follows Vs.

Therefore, when the vehicle starts to run downhill, the signal Vr' will be produced to the point A. At this time, Vs will be less than Vr (because the vehicle speed is now greater than the speed represented by Vr) and amplifier 244 will produce a negative output. However, the signal on line 107 will switch FET 226 conductive. A feedback path for amplifier 220 will therefore be established through the FET 226, resistor 228, FET 232 and line 238. This feedback path ensures that the voltage applied across the capacitor 230 is exactly equal to the voltage Vr', at point A and this signal Vr' is therefore applied to comparator 20 by line 26. As Vr' is slightly greater than Vs, comparator 20 therefore holds the engine power at reduced level as explained in conjunction with FIG. 1.

During this time, the two inputs of amplifier 254 are held at the same level.

Assuming that the downhill stretch of road is followed by an uphill stretch, the vehicle will decelerate as it begins to climb uphill. The signal on line 107 changes state and FET 226 is rendered non-conductive. Therefore, the value of signal Vr' is stored on capacitor 230 and line 26 is held constant via the high impedance of FET 232 which prevents leakage of the charge on the capacitor. Comparator 20 therefore begins to increase engine power when the actual vehicle speed falls below the speed represented by this value of Vr'.

Assuming that the vehicle continues to decelerate, even though the engine power is being increased in this way, eventually the output of operational amplifier 244 will go positive, when Vs becomes equal to Vr, and this renders FET 226 conductive through diode 246. The signal stored across capacitor 230 is therefore changed to the value of the signal at point A—which is substantially the same as Vs at this time, and therefore substantially the same as Vr. Comparator 20 therefore now acts to control the vehicle speed at the value represented by Vr.

If the road conditions are such that the vehicle does not continue to decelerate when the comparator 20 begins to increase the engine power as a result of detecting that Vs represents a speed less than Vr', but instead begins to accelerate, then the signal on line 107 will change and render FET 226 conductive. In the manner explained in detail with respect to FIG. 1, this will begin a cycle of operations which will gradually slow the vehicle down and bring the value of signal stored across the capacitor 230 to the value of Vr.

If the driver alters Vr to represent a lower desired speed, the signal at the positive input of amplifier 254 will become more than the signal at the negative input (which will be held constant by capacitor 250) and amplifier 254 therefore produces a positive output through diode 258 which will render FET 226 conductive so as to ensure that the signal on line 26 to comparator 20 is held at the new value of Vr. When the actual vehicle speed has dropped to the value represented by the new value of Vr, the output of amplifier 244 changes state and discharges capacitor 250 via resistor 260, diode 262 and capacitor 264.

In order to provide greater certainty that the driver's reduction of desired speed will not be misinterpreted as a hill, the output of amplifier 254 is also connected directly to the line 26 input of comparator 20 by means of a line 266, a diode 268 and a resistor 270.

A light emitting diode 272 fed from amplifier 244 via a resistor 274 can be used to give a visible signal to the driver whether the actual speed of the vehicle (represented by Vs) is greater than the desired speed (Vr).

What is claimed is:

1. A speed control system for automatically controlling an engine-powered vehicle to run at a desired speed set by the driver of the vehicle, comprising
   speed-responsive means connected to be responsive to the actual speed of the vehicle and having an output at which is produced an actual speed signal representing the actual vehicle speed,
   driver-controlled means adjustable by the driver and having an output at which is produced a desired speed signal representing a desired vehicle speed,
   a level changing circuit connected to receive the desired speed signal and the actual speed signal and operative to measure any difference between those signals and having an output at which is produced an output signal with a value which corresponds to the value of the desired speed signal when the actual vehicle speed does not exceed the desired speed by more than a predetermined amount but otherwise follows the value of the actual vehicle speed so as to represent an increasing vehicle speed as the vehicle descends a hill,
   a memory having an input and an output,
   switch means connected between the output of the level changing circuit and the input of the memory, whereby when the switch means is closed the said output signal of the level changing circuit is fed continuously to the input of the memory and appears at the output thereof with a value instantaneously the same as the value at the input thereof, and when the switch means is opened the memory stores the value of the output signal of the level changing circuit at the input when the switch means is opened, this stored value appearing at the output of the memory while the switch means is open,
   a first comparator having first and second inputs and an output,
   means connecting the output of the memory to the first input of the first comparator,
   means connecting said second input of the first comparator to said output of the speed-responsive means to receive said actual speed signal,
   whereby the first comparator produces at its output a speed error signal having a sign and magnitude depending on the sign and magnitude of the difference between the speeds represented by the signals at its said first and second inputs,
   output means connected to the engine and responsive to the sign and magnitude of the error signal to control the engine whereby to adjust its power in a direction and by an amount to bring the error signal to zero,
   a second comparator having first and second inputs respectively connected to receive the desired speed signal and the actual speed signal and an output at which is produced an output signal having a value dependent on the relative values of the desired speed signal and the actual speed signal,
   an acceleration-deceleration unit connected to respond to the actual speed of the vehicle and thus to the acceleration and deceleration of the vehicle so as to produce an output signal indicating whether the vehicle is accelerating or decelerating,
   control means connected to receive the output signals of the second comparator and the acceleration-deceleration unit and which produces an output signal dependent on the two signals received,
   means connecting the output signal of the control means to said switch means to close the switch means when the two signals received by the control means indicate that the vehicle is descending a hill and to open the switch means when the output signal of the acceleration-deceleration unit indicates that the vehicle is starting to decelerate after the hill so that the value of the output signal of the level changing circuit then stored in the memory represents the maximum speed attained by the vehicle before that deceleration,
   said control means being responsive to the output signal of the second comparator and to the output signal of the acceleration-deceleration unit to close the switch means either when the actual vehicle speed has fallen to a value substantially equal to the desired speed or when the vehicle starts to accelerate.

2. A system according to claim 1, including inhibiting means operative when the driver adjusts said driver-controlled means to yield a new desired speed signal to a value which represents a lower desired speed to prevent said control means from opening said switch means.

3. A system according to claim 2, in which the inhibiting means comprises a second memory connected to receive and store the value of the desired speed signal, a third comparator having a first input connected to receive the stored desired speed signal stored in said second memory, a second input connected to said driver-controlled means to continuously receive the new desired speed signal therefrom, and an output at which is produced an inhibiting signal when the relative values of the two signals as received at its first and second inputs indicate that the driver has adjusted said driver-controlled means to yield said new desired speed signal, means interconnecting this inhibiting signal to said control means to prevent said control means from opening said switch means, and means responsive to the output signal from the second comparator to reset the second memory to store said value of said new desired speed signal representing the said lower desired speed when the actual speed has fallen to a value substantially equal to this lower desired speed.

4. A system according to claim 1, in which the level changing circuit comprises an operational amplifier having first and second inputs and an output, means connecting the first input of the operational amplifier to the output of said speed-responsive means to receive said actual speed signal, means connecting the second input of the operational amplifier to the output of the driver-controlled means to receive said desired speed signal, and a diode connecting the output of the operational amplifier back to the second input of the operational amplifier, the diode being so poled that the signal value at the second input of the operational amplifier follows changes in value of the signal at the first input thereof when the actual speed signal represents a speed higher than represented by the desired speed signal.

* * * * *